(12) United States Patent
Ibel (10) Patent No.: US 9,043,888 B1
(45) Date of Patent: May 26, 2015

(54) DETECTING AUTOMATED IDENTITIES IN COMPUTER USER COMMUNITIES

(75) Inventor: Maximilian Ibel, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 158 days.

(21) Appl. No.: 13/469,035

(22) Filed: May 10, 2012

(51) Int. Cl.
*G06F 15/16* (2006.01)
*G06F 3/00* (2006.01)
*G06F 17/00* (2006.01)

(52) U.S. Cl.
CPC .. *G06F 3/00* (2013.01); *G06F 17/60* (2013.01)

(58) Field of Classification Search
CPC ............ G06F 15/16; G06F 3/00; G06F 21/00
USPC ............................................... 726/7; 715/745
See application file for complete search history.

(56) References Cited

U.S. PATENT DOCUMENTS

| 2002/0019764 | A1* | 2/2002 | Mascarenhas | 705/10 |
| 2010/0131589 | A1* | 5/2010 | Lawyer et al. | 709/203 |
| 2010/0218111 | A1* | 8/2010 | Mitchell et al. | 715/745 |

* cited by examiner

*Primary Examiner* — Brandon Hoffman
*Assistant Examiner* — Samuel Ambaye
(74) *Attorney, Agent, or Firm* — McDermott Will & Emery LLP (57) ABSTRACT

A computer-implemented method of detecting automated identities, including. The method includes, using one or more computing devices, providing for display to a user a first representation of a first profile for a first identity and a second representation of a second profile for a second identity, providing for display to the user a choice indication mechanism for indicating a judgment about the first representation of the first profile for the first identity and the second representation of the second profile for the second identity, receiving an indication of the judgment from the user about the first representation of the first profile for the first identity and the second representation of the second profile for the second identity, and determining whether at least one of the first identity, the second identity, or the user is more or less likely to be automated, based at least in part on the received indication.

22 Claims, 8 Drawing Sheets

DETECTING AUTOMATED IDENTITIES IN COMPUTER USER COMMUNITIES

BACKGROUND

1. Field

The present disclosure generally relates to detecting automated identities in computer user communities.

2. Description of the Related Art

Social networks are often plagued with people setting up fake identities to gather social interactions and other user data. This data can be gathered for various nefarious purposes such as spamming and identity theft.

One prevalent type of fake identity is a "robot" or automated identity that runs at least partially autonomously on a computing device.

Various techniques have been tried to weed out automated identities. Some of these techniques include asking a user to enter text matching noisy or distorted displayed characters. The concept behind this approach is that computer programs can have a difficult time using optical character recognition (OCR) techniques to read the noisy or distorted characters, whereas people can usually read the characters fairly easily. However, as OCR techniques have improved, the effectiveness of this type of approach has decreased.

SUMMARY

According to one aspect of the present disclosure, a computer-implemented method of detecting automated identities is provided. The method includes providing for display to a user, using one or more computing devices, a first representation of a first profile for a first identity and a second representation of a second profile for a second identity, and providing for display to the user, using the one or more computing devices, a choice indication mechanism for indicating a judgment about the first representation of the first profile for the first identity and the second representation of the second profile for the second identity. The method also includes receiving, using the one or more computing devices, an indication of the judgment from the user about the first representation of the first profile for the first identity and the second representation of the second profile for the second identity, and determining, using the one or more computing devices, whether at least one of the first identity, the second identity, or the user is more or less likely to be automated, based at least in part on the received indication.

According to another aspect of the present disclosure, a machine-readable storage medium comprising machine-readable instructions for causing a processor to execute a method of detecting automated identities is provided. The method includes providing for display to users, using one or more computing devices, a first representation of a first profile for a first identity and a second representation of a second profile for a second identity, and providing for display to the users, using the one or more computing devices, a choice indication mechanism for indicating a judgment about the first representation of the first profile for the first identity and the second representation of the second profile for the second identity. The method also includes receiving, using the one or more computing devices, indications of the judgment from the users about the first representation of the first profile for the first identity and the second representation of the second profile for the second identity, and determining, using the one or more computing devices, whether at least one of the first identity, the second identity, or the user is more or less likely to be automated, based at least in part on the received indications.

According to a further aspect of the present disclosure, a system for detecting automated identities is provided. The system includes a memory and processing hardware. The memory includes at least a first profile for a first identity and a second profile for a second identity. The processing hardware is configured to provide for display to a user, using one or more computing devices, a first representation of a first profile for a first identity and a second representation of a second profile for a second identity, and to provide for display to the user, using the one or more computing devices, at least one question about first representation of the first profile for the first identity and the second representation of the second profile for the second identity. The processing hardware is also configured to receive, using the one or more computing devices, an answer to the at least one question from the user, and to determine, using the one or more computing devices, whether at least one of the first identity, the second identity, or the user is more or less likely to be automated, based on the received answer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Although certain examples provided herein describe a user's information (e.g., profiles) being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

Social networks are often plagued with people setting up fake identities to gather social interactions and other user data. This data can be gathered for various nefarious purposes such as spamming and identity theft. One prevalent type of fake identity is a "robot" or automated identity that runs at least partially autonomously on a computing device.

Various techniques have been tried to weed out automated identities. Some of these techniques include asking a user to enter text matching noisy or distorted displayed characters. The concept behind this approach is that computer programs can have a difficult time using optical character recognition (OCR) techniques to read the noisy or distorted characters, whereas people can usually read the characters fairly easily. However, as OCR techniques have improved, the effectiveness of this type of approach has decreased.

In one aspect, the disclosure addresses this need via a computer-implemented method of detecting automated identities and profiles. The method includes providing for display to a user, using one or more computing devices, a first representation of a first profile for a first identity and a second representation of a second profile for a second identity, and providing for display to the user, using the one or more computing devices, a choice indication mechanism for indicating a judgment about the first representation of the first profile for the first identity and the second representation of the second profile for the second identity. The method also includes receiving, using the one or more computing devices, an indication of the judgment from the user about the first representation of the first profile for the first identity and the second representation of the second profile for the second identity, and determining, using the one or more computing devices, whether at least one of the first identity, the second identity, or the user is more or less likely to be automated, based at least in part on the received indication.

Whether an identity is automated or non-automated is characterized as being "known" or "unknown" in certain parts of this disclosure. For brevity, the term "known identity" refers to an identity whose nature (i.e., automated or non-automated) is known, and the term "unknown identity" refers to an identity whose nature (i.e., automated or non-automated) is unknown.

In some aspects, known and unknown can be with respect to some level of confidence. The level of confidence can be quantified according to certain aspects of the subject technology. The terms "likely" and "unlikely" can represent this quantification. For example, an identity that is known to be automated or non-automated with greater than an 80% (or any other percent) confidence level can be considered "likely automated" or "unlikely non-automated," respectively. Different confidence levels can represent "likely" and "unlikely," for example confidence levels representing some statistical measure such as standard deviations. An identity that is not known to be automated or non-automated by at least the confidence level can be characterized as "unknown."

Other approaches for using confidence levels, characterizing natures of identities as known or unknown, and applying meanings to the terms "likely" and "unlikely" can be used. Confidence levels need not be quantified in some of these approaches.

Furthermore, the terms "known" and "unknown," the natures of identities (i.e., automated or non-automated), and confidence levels can represent or be represented by information stored by a computing device that presents the representations of profiles for display and judgment. The information also can be stored by another computing device, for example a device that passes the profiles to a computing device for presentation to a user. The information can be stored in other devices as well.

The natures of identities can be or become known through the processes disclosed herein. The natures can be or become known in other ways as well, for example verification through other processes or by being created by a person or entity that stores information about the identities or their profiles.

Throughout this disclosure, an increase in confidence that an identity is automated can be replaced with a decrease in confidence that the identity is non-automated. Likewise, a decrease in confidence that an identity is automated can be replaced with an increase in confidence that the identity is non-automated.

Figure 1:
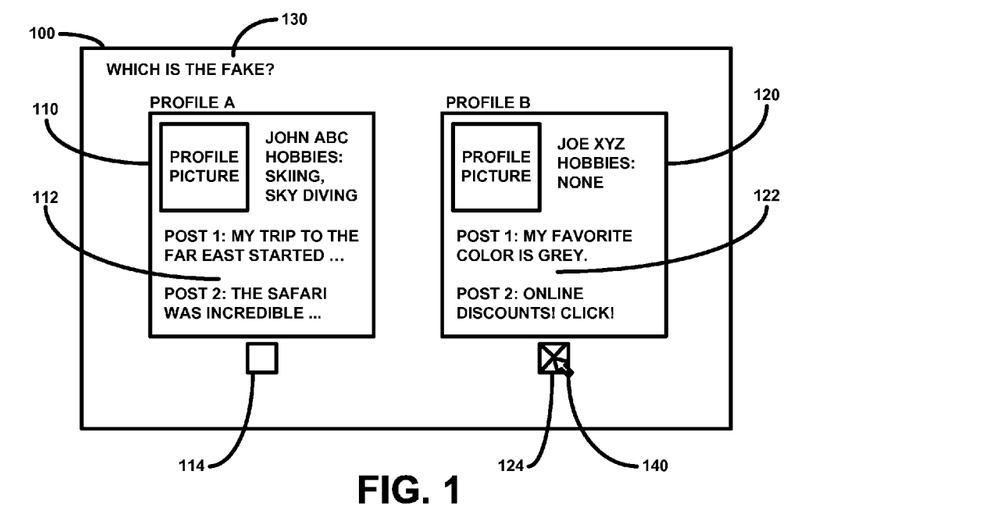
FIG. 1 shows an example of an interface for displaying representations of profiles to a user according to aspects of the disclosure.

FIG. 1 shows an example of an interface for displaying representations of profiles to a user according to aspects of the disclosure. Interface 100 shows representations 110 and 120 of two profiles A and B. Each representation includes profile information 112 and 122, respectively. In the example shown in FIG. 1, the profile information includes a profile picture, a name, a location (city, state, and country), and examples of posts by that identity. Other information can be used. For example, profile information can include but is not limited to one or more of names, addresses, other geographic information, pictures, posts or comments made by the identities associated with the profiles, and any other information associated with an identity. In other aspects, representations of one profile or more than two profiles can be shown to a user or users.

A choice indication mechanism is provided to accept an indication of a judgment by a user about the representations of the profiles. In FIG. 1, an example of a choice indication mechanism is shown as question 130, namely "Which is fake?," and check boxes 114 and 124 for the user to provide an answer to the question. For example, a representation of a profile associated with an automated identity can be considered fake. In FIG. 1, cursor 140 has been used to check box 124, indicating that the user has judged representation 120 of profile B to be fake.

Figure 2:
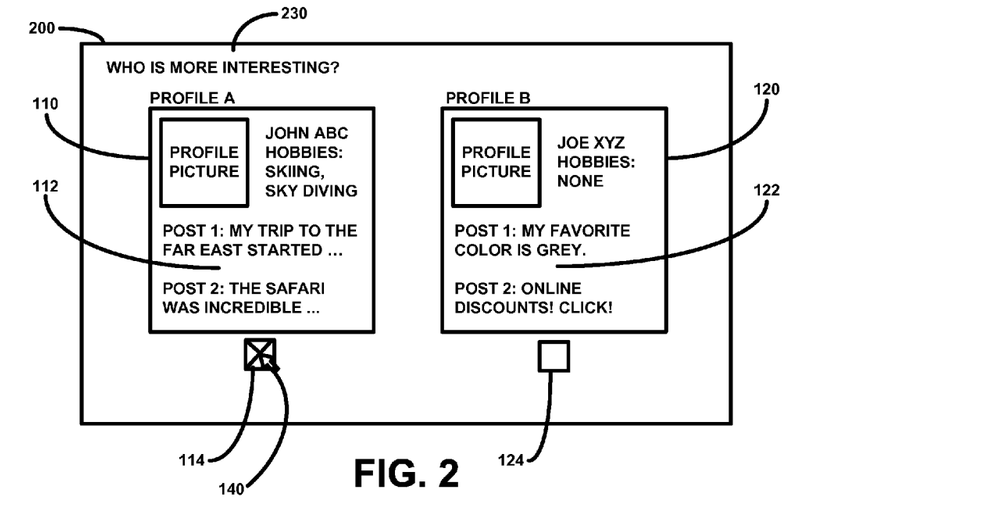
FIG. 2 shows another example of an interface for displaying representations of profiles to a user according to aspects of the disclosure.

FIG. 2 shows another example of an interface for displaying representations of profiles to a user according to aspects of the disclosure. This interface 200 includes the same profile information as FIG. 1, but asks a different question to elicit a different type of judgment. The question in FIG. 2 may be less confrontational than the question in FIG. 1. In particular, question 230 asks "Who is more interesting?" Cursor 140 has been used to check box 114, indicating that the user has judged representation 110 of profile A to be more interesting.

Many other questions can be used instead of questions 130 and 230. For example, a user could be asked to judge which profile's representation appears to be "real" (i.e., of a profile for a non-automated identity), "a person's," "more boring," "more interesting," "less interesting," "more attractive," "less attractive," or virtually any other question. In addition, various other choice indication mechanisms different from those shown in FIGS. 1 and 2 can be provided to accept an indication of the user's judgment. For example, one or more questions could be provided in other ways such as via audio output or in any other way that a computing device can present a choice. In some aspects, the choice indication mechanism can omit explicit presentation of a choice. For another example, the user's indication could be accepted in other ways such as by accepting a click on a profile's representation, via audio input, or by any other way that a computing device can accept input.

Figure 3:
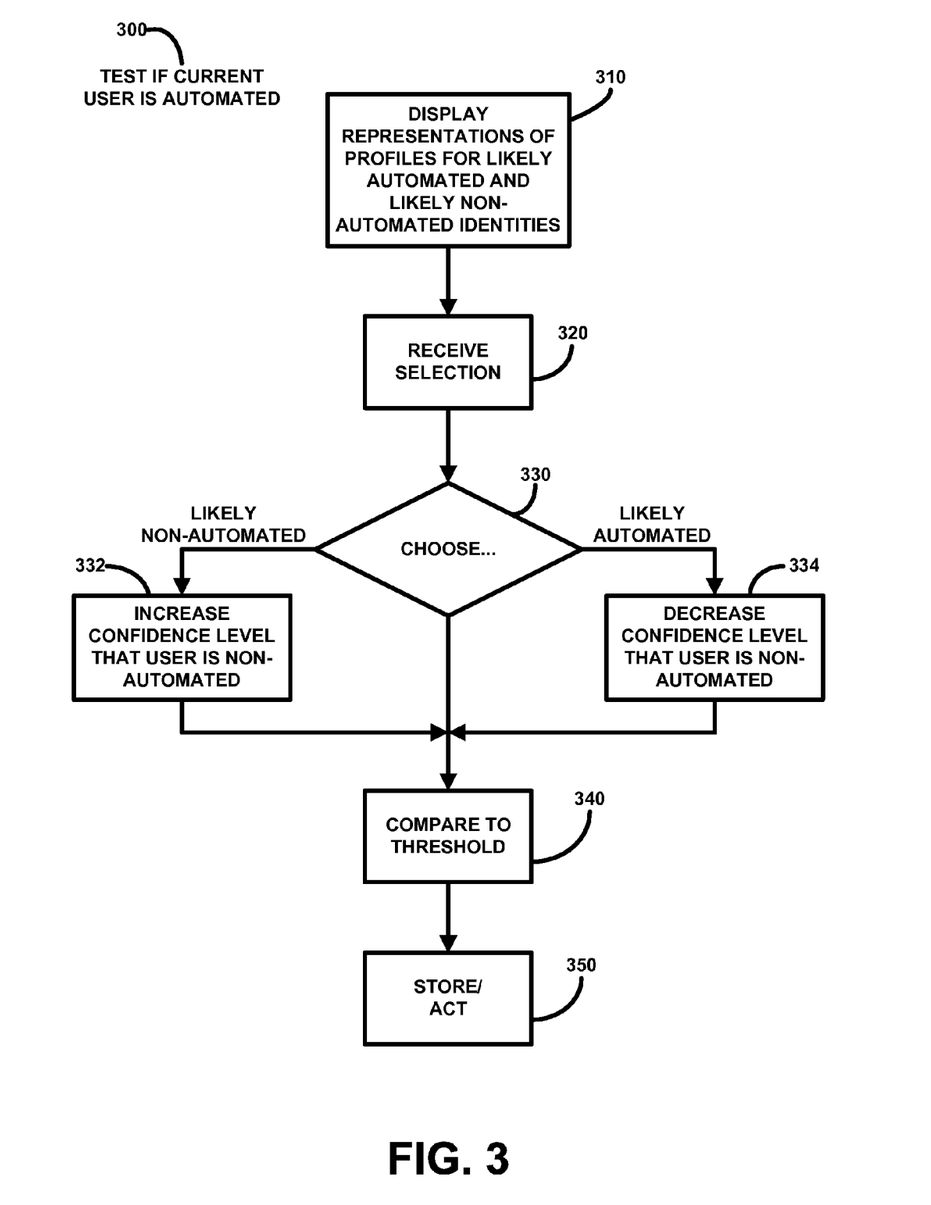
FIG. 3 shows a flowchart for one example of an approach for making a determination about whether a user is more or less likely to be automated according to aspects of the disclosure.

FIG. 3 shows a flowchart for one example of an approach for making a determination about whether a user is more or less likely to be automated. This approach can be used with an interface such as the ones shown in FIGS. 1 and 2, but is not limited to those interfaces.

In FIG. 3, the natures of the identities associated with the profiles are "known." The nature of the user is "unknown." If the user judges a representation of a profile for the automated identity to be more real or interesting, then the confidence that the user is automated can be increased. If the user judges a representation of a profile for the non-automated identity to be more real or interesting, then the confidence that the user is non-automated can be increased.

Representations of two profiles are displayed to a user in block 310 of FIG. 3. The natures of the identities associated with the profiles are "known." One of the profiles in block 310 is likely a non-automated identity's profile, and the other is likely an automated identity's profile. The nature of the user is "unknown."

In block 320, an indication of a selection of one of the representations of the profiles is received through a provided choice indication mechanism. For purposes of this discussion, the selection represents a judgment that the selected representation appears to be more interesting or associated with a non-automated identity's profile.

Decision block 330 directs flow to block 332 if the selection is of the representation of the likely non-automated identity's profile. A confidence level that the user is likely non-automated can be increased in block 332. Decision block 330 directs flow to block 334 if the selection is of the representation of the likely automated identity's profile. A confidence level that the user is likely non-automated can be decreased in block 334. In other approaches, the confidence level can be in terms of a likelihood that the user is automated, in which case these changes can be reversed. Other techniques for measuring and changing the confidence level can be used.

If an opposite question is asked, for example "Which is fake?," the flow decision by block 330 can be reversed. For example, a selection of a representation of a likely non-automated identity's profile as appearing more fake can indicate that the user is more likely to be automated, so flow can be to block 334. For another example, a selection of a representation of a likely automated identity's profile as appearing more fake can indicate that the user is more likely to be a non-automated, so flow can be to block 332.

One rationale for the direction of flow by block 330 is that people can often be better than automated identities at spotting other people. Thus, a correct decision by a user about the representations of the profiles can give insight into the nature of the user. This disclosure is not limited to this rationale.

In the foregoing blocks, similar changes and decisions can be made based on other questions and other indications of judgments, for example as discussed above with respect to FIGS. 1 and 2.

Possible actions that can be taken in response to the changed confidence level are shown in blocks 340 and 350. In one aspect, the confidence level can be compared to a threshold for taking action. This aspect is shown in block 340. In another aspect, the confidence level can be stored or acted upon in block 350, for example by banning a user or making a determination that a user is in fact non-automated. Any other action that depends on a nature of an identity of a user can be taken in these blocks.

Figure 4:
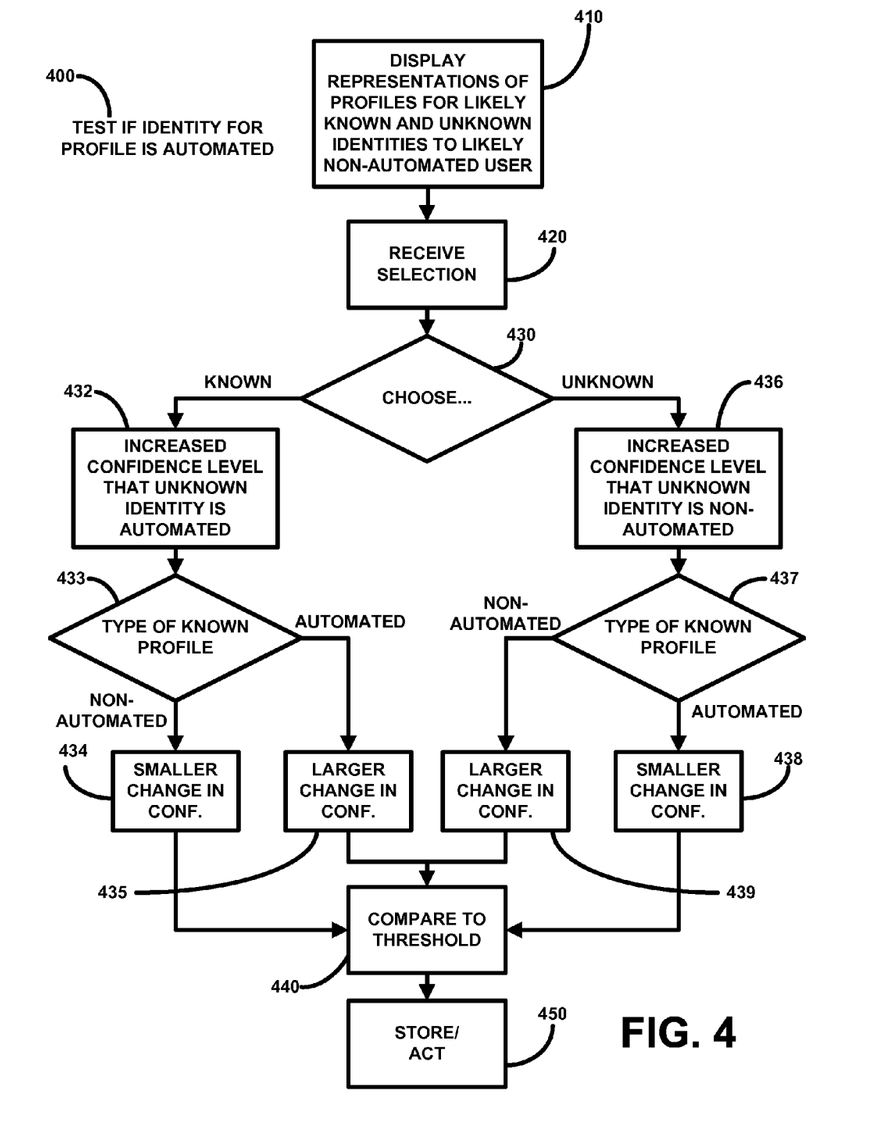
FIG. 4 shows a flowchart for an example of an approach for making a determination about whether an identity associated with a profile is more or less likely to be automated according to aspects of the disclosure.

FIG. 4 shows a flowchart for an example of an approach for making a determination about whether an identity associated with a profile is more or less likely to be automated. This approach can be used with an interface such as the ones shown in FIGS. 1 and 2, but is not limited to those interfaces.

In FIG. 4, the nature of the user is known to be non-automated. The nature of an identity associated with a first profile is "known." The nature of an identity associated with a second profile is "unknown." If the non-automated user judges a representation of a profile for the known identity to be more real or interesting, then the confidence that the unknown identity is automated can be increased. If the non-automated user judges a representation of a profile for the unknown identity to be more real or interesting, then the confidence that the unknown identity is non-automated can be increased.

Representations of two profiles are displayed to a user in block 410 of FIG. 4. The nature of the user is known to be non-automated, and the nature of the identity associated with one of the profiles is "known." The nature of the identity associated with the other of the profiles is "unknown."

In block 420, an indication of a selection of one of the representations of the profiles is received through a provided choice indication mechanism. For purposes of this discussion, the selection represents a judgment that the selected representation appears to be more interesting or real (i.e., associated with a real identity's profile).

Decision block 430 directs flow to block 432 if the selection is of the representation of the profile associated with the identity whose nature is known. Decision block 430 directs flow to block 436 if the selection is of the representation of the profile associated with the identity whose nature is unknown. If an opposite question is asked, for example "which is fake," the flow decision by block 430 can be reversed.

In block 432, a confidence level that the unknown identity is automated can be increased. In block 436, a confidence level that the unknown identity is non-automated can be increased. Other techniques for measuring and changing the confidence level can be used.

These changes in confidence level can be adjusted based on the nature of the identity whose nature is known. For example, if a non-automated user picks a representation of an unknown identity's profile as appearing more real than a representation of a known non-automated identity's profile, then the change in confidence level that the unknown identity is non-automated can be high. If the non-automated user picks a representation of an unknown identity's profile as less real than a representation of a known automated identity's profile, then the change in confidence that the unknown identity is automated can also be high. The opposite cases (e.g., a representation of a known non-automated identity's profile picked as real over a representation of an unknown identity's profile or a representation of an unknown identity's profile picked as real over a representation of an automated identity's profile) can result in a lesser change in confidence. These different scenarios are discussed in more detail below with respect to blocks 433 to 435 and 437 to 439.

Block 434 can be reached from block 433 when a non-automated user picks a representation of a known non-automated identity's profile as appearing more real than a representation of an unknown identity's profile. This can tell limited information about the nature of the unknown identity. That unknown identity can actually be automated, or the identity can be non-automated with a less real looking profile that the known non-automated identity's profile. Therefore, a smaller increase in confidence that the unknown identity is automated can result in block 434.

Block 435 can be reached from block 433 when a non-automated user picks a representation of a known automated identity's profile as appearing more real than a representation of an unknown identity's profile. This can tell significant information about the nature of the unknown identity, namely that the unknown identity's profile may not look as real to the user as a known automated identity's profile. Therefore, a larger increase in confidence that the unknown identity is automated can result in block 435.

Block 438 can be reached from block 437 when a non-automated user picks a representation of an unknown identity's profile as appearing more real than a representation of a known automated identity's profile. This can tell limited information about the nature of the unknown identity. That unknown identity can actually be non-automated, or the identity can be automated with a more real looking profile than the known automated identity's profile. Therefore, a small increase in confidence that the unknown identity is non-automated can result in block 438.

Block 439 can be reached from block 437 when a non-automated user picks a representation of an unknown identity's profile as appearing more real than a representation of a known non-automated identity's profile. This can tell significant information about the nature of the unknown identity, namely that the unknown identity's profile may look more real than a known non-automated identity's profile. Therefore, a larger increase in confidence that the unknown identity is non-automated can result in block 439.

In the foregoing blocks, similar changes and decisions can be made based on other questions and other judgments, for example as discussed above with respect to FIGS. 1 and 2.

Possible actions that can be taken in response to the changed confidence level are shown in blocks 440 and 450. In one aspect, the confidence level can be compared to a threshold for taking action. This aspect is shown in block 440. In another aspect, the confidence level can be stored or acted upon in block 450, for example by banning a automated identity's profile, banning an automated identity, or making a determination that a profile is in fact associated with a non-automated identity. Any other action that depends on a nature of an identity associated with a profile can be taken in these blocks.

Figure 5:
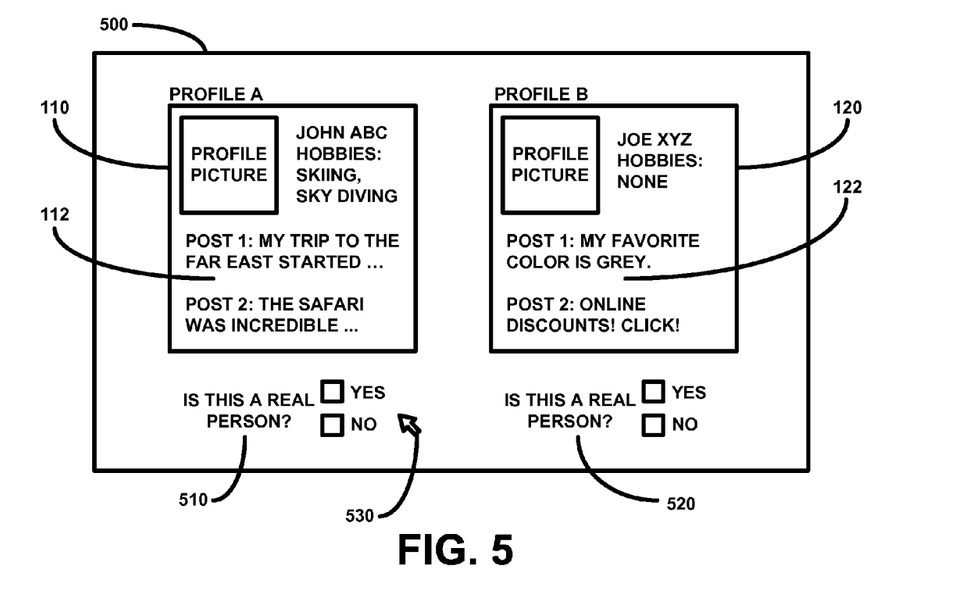
FIG. 5 shows another example of an interface for displaying representations of profiles to a user according to aspects of the disclosure.

FIG. 5 shows another example of an interface for displaying representations of profiles to a user according to aspects of the disclosure.

FIG. 5 shows yet another example of an interface for displaying representations of profiles to a user according to aspects of the disclosure. This interface 500 includes the same representations of profile information as FIGS. 1 and 2, but asks different questions to elicit different types of judgments. The questions in FIG. 5 request that the user make two judgments: whether each profile is "a real person." Cursor 530 can be used to provide answers to both questions 510 and 520 through a provided choice indication mechanism. In FIG. 5, an example of such a mechanism is shown as check boxes for answering "yes" or "no" to both questions. Other choice indication mechanisms can be provided.

Figure 6:
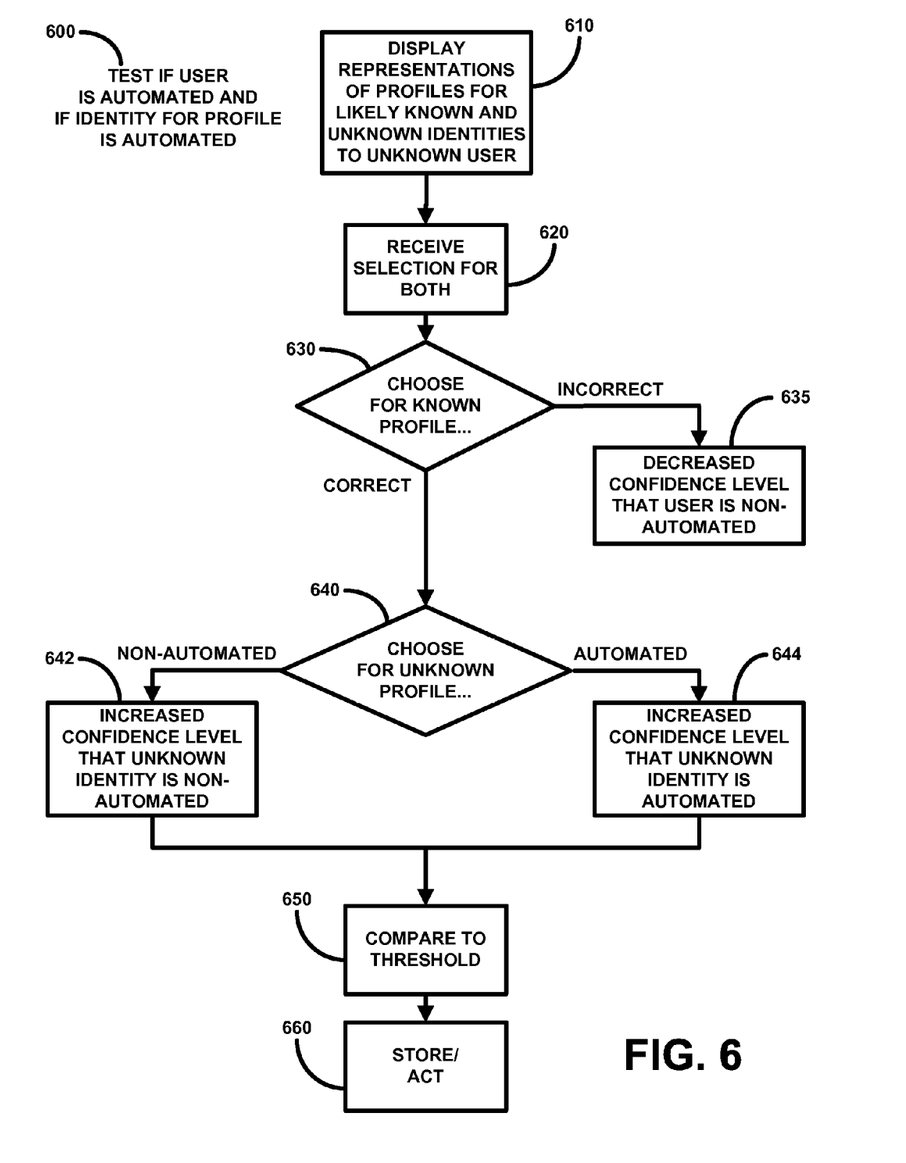
FIG. 6 shows a flowchart for an example of an approach for making a determination about whether an identity associated with a profile and an identity associated with a user are more or less likely to be automated according to aspects of this disclosure.

FIG. 6 shows a flowchart for an example of an approach for making a determination about whether an identity associated with a profile and an identity associated with a user are more or less likely to be automated. This approach can be used with an interface such as the one shown in FIG. 5, but is not limited to that interface.

In FIG. 6, the nature of the user is "unknown." The nature of an identity associated with a first profile is "known." The nature of an identity associated with a second profile is "unknown." If the user correctly judges the nature of the known identity from the representation of that identity's profile, then the user is more likely to be non-automated. In that case, a confidence level that the user is non-automated can be increased. In addition, the user's judgment about the representation of the unknown identity's profile can be used to adjust a confidence level about the nature of the unknown identity.

Representations of two profiles are displayed to a user in block 610 of FIG. 6. The nature of the identity associated with one of the profiles is "known." The natures of the identities associated with the other one of the profiles and the user are "unknown."

In block 620, indications of selections about representations of both of the profiles are received through a provided choice indication mechanism. For example, selections of answers to questions 510 and 520 can be received from a user using cursor 530 in example interface 500 of FIG. 5. Selections for both profiles can be received in other ways through other interfaces.

Decision block 630 directs flow to block 635 if the selection about the representation of the known identity's profile is incorrect. In that case, a level of confidence that the user is a non-automated can be decreased in that block, and flow can stop. Other techniques for measuring and changing the confidence level can be used.

Decision block 630 directs flow to block 640 if the selection about the representation of the known identity's profile is correct. In that case, a level of confidence that the user is a non-automated can be increase in that block, and flow can continue. Other techniques for measuring and changing the confidence level can be used.

In block 640, flow can be directed based on the user's selection about the representation of the unknown identity's profile. If the user judges that the representation is of a non-automated identity's profile, a confidence level that the profile is a non-automated identity's can be increased in block 642. If the user judges that the representation is of an automated identity's profile, a confidence level that the profile is an automated identity's can be increased in block 644. Other techniques for measuring and changing the confidence level can be used.

In the foregoing blocks, similar changes and decisions can be made based on other questions and other judgments, for example as discussed above with respect to FIGS. 1 and 2.

Possible actions that can be taken in response to the changed confidence level are shown in blocks 650 and 660. In one aspect, the confidence levels can be compared to thresholds for taking action. This aspect is shown in block 650. In another aspect, the confidence levels can be stored or acted upon in block 660, for example by banning a automated identity's profile, banning a automated identity, or making a determination that a profile is in fact associated with a non-automated identity or a user is in fact non-automated. Any other action that depends on a nature of an identity associated with a profile can be taken in these blocks.

Aspects of the approaches discussed with respect to FIGS. 1 to 6 can be combined. Aspects of the approaches are not limited to the display of two profiles at a time. For example, representations of three, five, ten, or some other number of profiles can be shown to a user, and the user can be asked to pick the most or least real or fake one(s) of those profiles based on the displayed representations. For another example, a representation of a single profile can be displayed, and the user can be asked whether the profile is real or fake. The user also can be asked questions about the profiles other than those discussed in this disclosure.

In addition, in different aspects, various ones of the approaches can be repeated over time with values representing levels of confidence about the natures of the identities and different users built up after many iterations. In those iterations, positions of representations of known and unknown or likely automated and likely non-automated identities' profiles can be switched, for example randomly. This switching can increase the importance of the profile information as opposed to position information.

In other aspects of the disclosure, incentives can be provided to users to make judgments about profiles. For example, and without limitation, reward points, payment, and the like can be offered. In yet other aspects, a user's accuracy over several iterations can be used to score points such as for a game. Other incentives can be used or offered.

Figure 7:
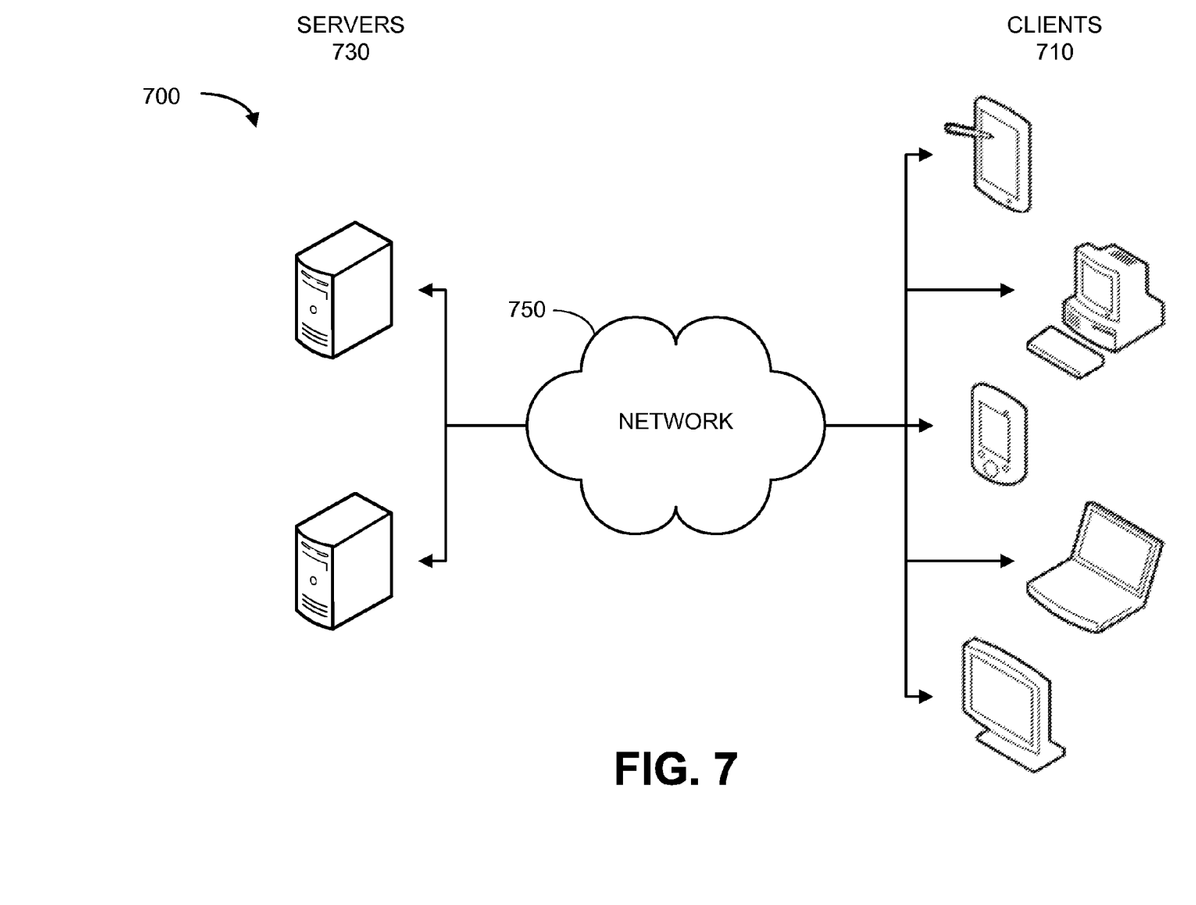
FIG. 7 illustrates an example of an architecture for making a determination about whether identities associated with user(s) and/or profile(s) are more or less likely to be automated according to aspects of this disclosure.

FIG. 7 illustrates an example of architecture 700 for making a determination about whether identities associated with user(s) and/or profile(s) are more or less likely to be automated or non-automated according to aspects of this disclosure.

The architecture 700 includes servers 730 and clients 710 connected over a network 750. One of the many servers 730 can be configured to host instructions and information such as profile data for use in displaying profile information and processing judgments about that profile information. For purposes of load balancing, multiple servers 730 can host (or portions thereof). Alternatively, one of the many clients can host can perform the operations discussed in this disclosure without the assistance of a server.

Clients 710 and servers 730 can be any computing devices having processing hardware, memory, and communications capability necessary to perform some or all of the techniques disclosed herein. Clients 710 to which servers 730 are connected over the network 750 can be, for example, desktop computers, mobile computers, tablet computers (e.g., including e-book readers), mobile devices (e.g., a smartphones or personal digital assistants), set top boxes (e.g., for a television with one or more processors coupled thereto and/or embedded therein), video game consoles, or any other devices having memory, processing hardware, and communications capabilities for making a determination about whether identities associated with user(s) and/or profile(s) are more or less likely to be automated or non-automated according to aspects of this disclosure.

The network 750 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, the network can include, but is not limited to, any one or more network topologies such as a bus network, a star network, a ring network, a mesh network, a star-bus network, tree or hierarchical network, and the like. The communications modules can be, for example, modems or Ethernet cards.

Figure 8:
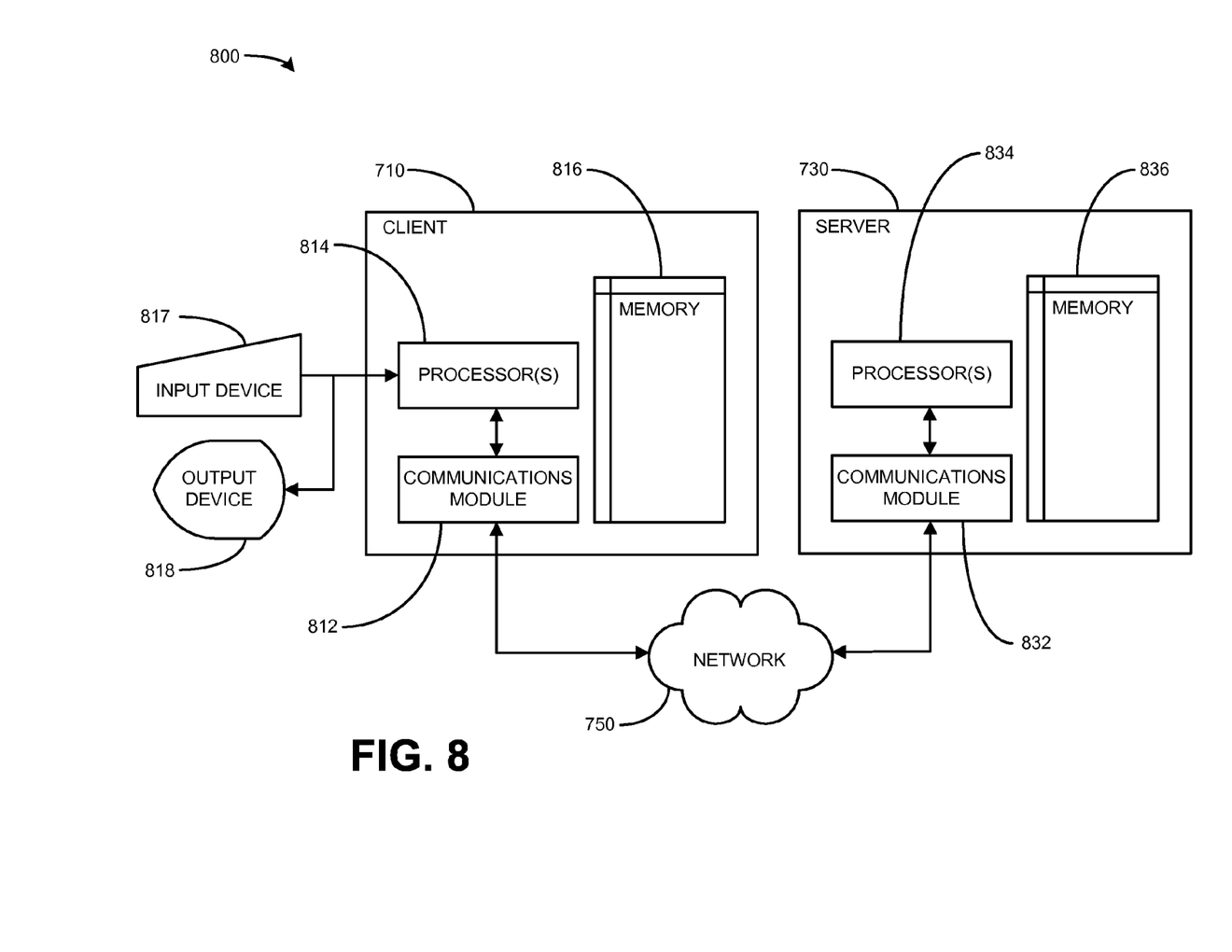
FIG. 8 is a block diagram illustrating examples of a client and a server from the architecture of FIG. 7 according to certain aspects of the disclosure.

FIG. 8 is a block diagram 800 illustrating examples of client 710 and server 730 in architecture 700 of FIG. 7 according to certain aspects of the disclosure. Client 710 and server 730 are connected over the network 750 via respective communications modules 812 and 832. Communications modules 812 and 832 are configured to interface with network 750 to send and receive information, such as data, requests, responses, and commands to other devices on the network. Communications modules 812 and 832 can be, for example, modems or Ethernet cards.

Both client 710 and server 730 can include processing hardware and some form of memory. In FIG. 8, client 710 includes processor 814 and memory 816, and server 730 includes processor 834 and memory 836. Memory 816 and 836 can be volatile or non-volatile memory. Client 710 also can include input device 817 and output device 818 for accepting input from and providing output to a user. Server 730 also can include such input and output devices.

Figure 9:
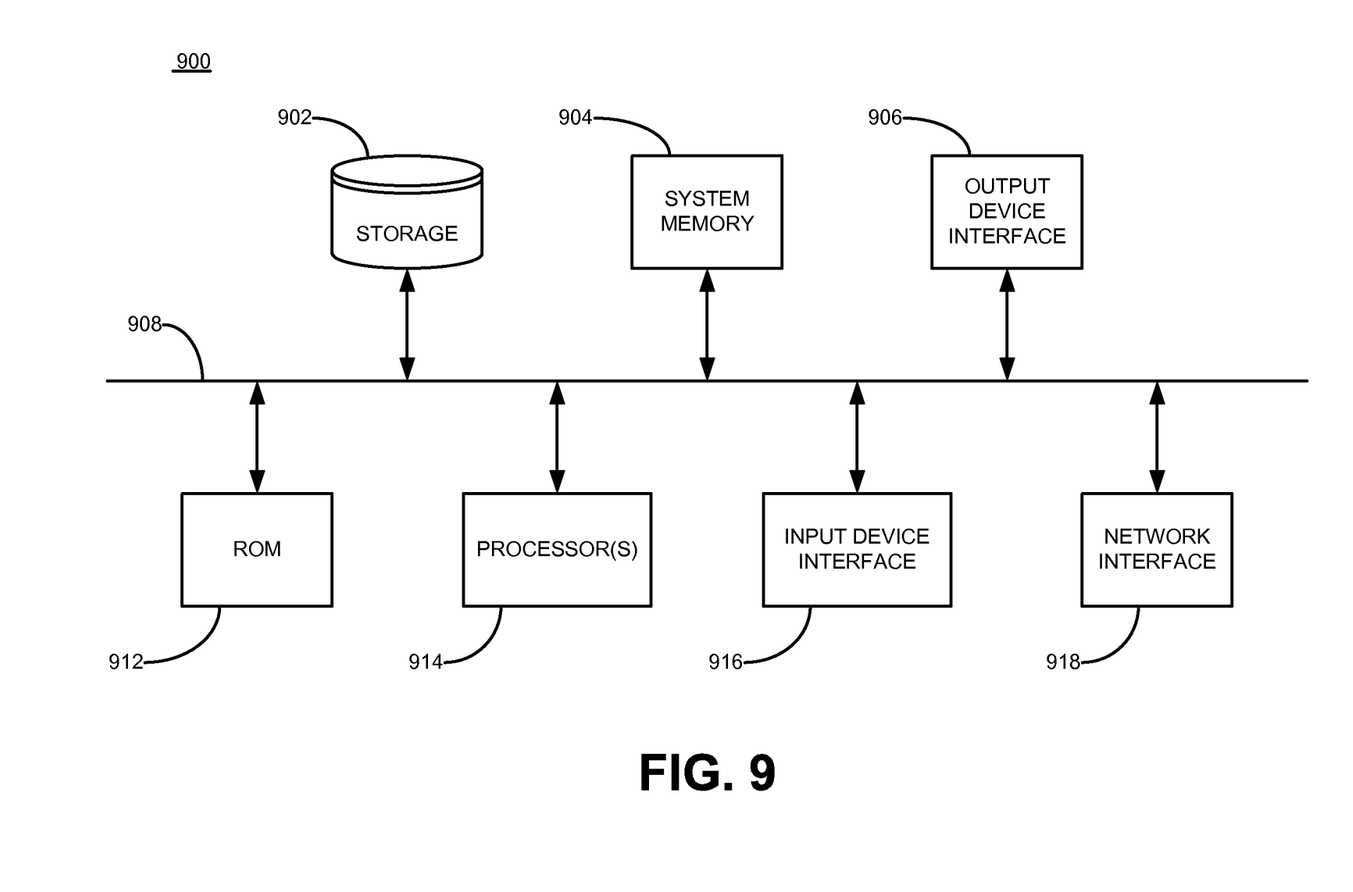
FIG. 9 conceptually illustrates an example of an electronic system with which some aspects of the subject technology can be implemented.

FIG. 9 conceptually illustrates an example of an electronic system with which some aspects of the subject technology can be implemented. Electronic system 900 can be a computer, phone, PDA, or any other sort of electronic device. Electronic device 900 can also be embedded in another device, for example, and without limitation, a mobile telephone, a personal digital assistant (PDA), a mobile audio player, a Global Positioning System (GPS) receiver, a video game console, and/or a television set top box.

Such an electronic system can include various types of computer readable media and interfaces for various other types of computer readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. For example, the various memory units can include instructions for making a determination about whether identities associated with user(s) and/or profile(s) are more or less likely to be automated or non-automated according to aspects of the disclosure. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that functions as both input and output devices.

Finally, as shown in FIG. 9, bus 908 also couples electronic system 900 to a network (not shown) through a network interface 916. In this manner, the computer can be a part of a network of computers such as network 750. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, PROM, EPROM, FLASH EPROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, floppy disks, and any other memory chip or cartridge, or any other medium from which a computer can read.

The machine-readable storage medium can be a machine-readable storage device, a machine-readable storage substrate, a memory device, a composition of matter effecting a machine-readable propagated signal, or a combination of one or more of them.

The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations can be performed by one or more integrated circuits, such as application specific integrated circuits (ASICs) or field programmable gate arrays (FPGAs). In some implementations, such integrated circuits execute instructions that are stored on the circuit itself.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Various aspects of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Likewise, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

These and other implementations are within the scope of the following claims.

What is claimed is:

1. A computer-implemented method of detecting automated identities, comprising:
providing for display to a user, using one or more computing devices, a first representation of a first profile for a first identity and a second representation of a second profile for a second identity, wherein the first identity and the second identity correspond to separate users that are different than the user;
providing for display to the user, using the one or more computing devices, a choice indication mechanism for indicating a judgment about the first representation of the first profile for the first identity and the second representation of the second profile for the second identity;
receiving, using the one or more computing devices, an indication of the judgment from the user about the first representation of the first profile for the first identity and the second representation of the second profile for the second identity;
determining, using the one or more computing devices, whether at least one of the first identity, the second identity, or the user is more or less likely to be automated, based at least in part on the received indication, wherein determining whether at least one of the first identity, the second identity, or the user are more or less likely to be automated is measured with confidence levels; and
modifying the confidence levels based on the determining.

2. The computer-implemented method of claim 1, wherein the choice indication mechanism accepts an indication of which of the first representation of the first profile or the second representation of the second profile the user judges to be fake.

3. The computer-implemented method of claim 1, wherein the choice indication mechanism accepts an indication of which of the first representation of the first profile or the second representation of the second profile the user judges to be more real or interesting.

4. The computer-implemented method of claim 1, wherein the choice indication mechanism accepts an indication of whether the user judges the first representation of the first profile to be real or fake and an indication whether the user judges the second representation of the second profile to be real or fake.

5. The computer-implemented method of claim 1, wherein the first identity is likely non-automated and the second identity is likely automated; and
wherein the step of determining comprises determining whether the user is more or less likely to be automated based at least in part on the received indication.

6. The computer-implemented method of claim 1, wherein the user and the first identity are likely non-automated; and
wherein the step of determining comprises determining whether the second identity is more or less likely to be automated based at least in part on the received indication.

7. The computer-implemented method of claim 1, wherein the user is likely non-automated and the first identity is likely automated; and
wherein the step of determining comprises determining whether the second identity is more or less likely to be automated based at least in part on the received indication.

8. A non-transitory machine-readable storage medium comprising machine-readable instructions for causing a processor to execute a method of detecting automated identities, the method comprising:
providing for display to users a first representation of a first profile for a first identity and a second representation of a second profile for a second identity, wherein the first identity and the second identity correspond to separate users that are different than the user;

providing for display to the users a choice indication mechanism for indicating a judgment about the first representation of the first profile for the first identity and the second representation of the second profile for the second identity;

receiving indications of the judgment from the users about the first representation of the first profile for the first identity and the second representation of the second profile for the second identity;

determining whether at least one of the first identity, the second identity, or the user is more or less likely to be automated, based at least in part on the received indications, wherein determining whether at least one of the first identity, the second identity, or the user are more or less likely to be automated is measured with confidence levels; and modifying the confidence levels based on the step of determining.

9. The non-transitory machine-readable storage medium of claim 8, wherein the choice indication mechanism accepts an indication of which of the first representation of the first profile or the second representation of the second profile the user judges to be fake.

10. The non-transitory machine-readable storage medium of claim 8, wherein the choice indication mechanism accepts an indication of which of the first representation of the first profile or the second representation of the second profile the user judges to be more real or interesting.

11. The non-transitory machine-readable storage medium of claim 8, wherein the choice indication mechanism accepts an indication of whether the user judges the first representation of the first profile to be real or fake and an indication whether the user judges the second representation of the second profile to be real or fake.

12. The non-transitory machine-readable storage medium of claim 8, wherein the first identity is likely non-automated and the second identity is likely automated; and wherein the step of determining comprises determining whether the user is more or less likely to be automated based at least in part on the received indications.

13. The non-transitory machine-readable storage medium of claim 8, wherein the user and the first identity are likely non-automated; and wherein the step of determining comprises determining whether the second identity is more or less likely to be automated based at least in part on the received indications.

14. The non-transitory machine-readable storage medium of claim 8, wherein the user is likely non-automated and the first identity is likely automated; and wherein the step of determining comprises determining whether the second identity is more or less likely to be automated based at least in part on the received indications.

15. A system for detecting automated identities, the system comprising:

a memory comprising at least a first profile for a first identity and a second profile for a second identity; and processing hardware configured to:

provide for display to a user a first representation of a first profile for a first identity and a second representation of a second profile for a second identity, wherein the first identity and the second identity correspond to separate users that are different than the user;

provide for display to the user at least one question about first representation of the first profile for the first identity and the second representation of the second profile for the second identity;

receive an answer to the at least one question from the user; and determine whether at least one of the first identity, the second identity, or the user is more or less likely to be automated, based on the received answer, wherein whether at least one of the first identity, the second identity, or the user are more or less likely to be automated is measured with confidence levels.

16. The system of claim 15, wherein the at least one question asks which of the first representation of the first profile or the second representation of the second profile is fake.

17. The system of claim 15, wherein the at least one question asks which of the first representation of the first profile or the second representation of the second profile is more real or interesting.

18. The system of claim 15, wherein the at least one question asks whether the first representation of the first profile is real or fake and whether the second representation of the second profile is real or fake.

19. The system of claim 15, wherein the first identity is likely non-automated and the second identity is likely automated; and wherein the processing hardware is configured to determine whether at least one of the first identity, the second identity, or the user is more or less likely to be automated by being configured to determine whether the user is more or less likely to be automated.

20. The system of claim 15, wherein the user and the first identity are likely non-automated; and wherein the processing hardware is configured to determine whether at least one of the first identity, the second identity, or the user is more or less likely to be automated by being configured to determine whether the second identity is more or less likely to be automated.

21. The system of claim 15, wherein the user is likely non-automated and the first identity is likely automated; and wherein the processing hardware is configured to determine whether at least one of the first identity, the second identity, or the user is more or less likely to be automated by being configured to determine whether the second identity is more or less likely to be automated.

22. The computer-implemented method of claim 1, wherein each of the first representation and the second representation indicate respective characteristics of the separate users corresponding to the first identity and the second identity, the respective characteristics comprising two or more of a profile picture, a name, a location, a social network post or comment, or a hobby.

* * * * *